June 7, 1966

J. L. HENSLEY 3,254,455

RAIL SAW

Filed Oct. 16, 1963

INVENTOR
JAMES L. HENSLEY,

BY
Burns, Doane, Benedict, Swecker & Mathis
ATTORNEYS

June 7, 1966  J. L. HENSLEY  3,254,455
RAIL SAW
Filed Oct. 16, 1963  6 Sheets-Sheet 2
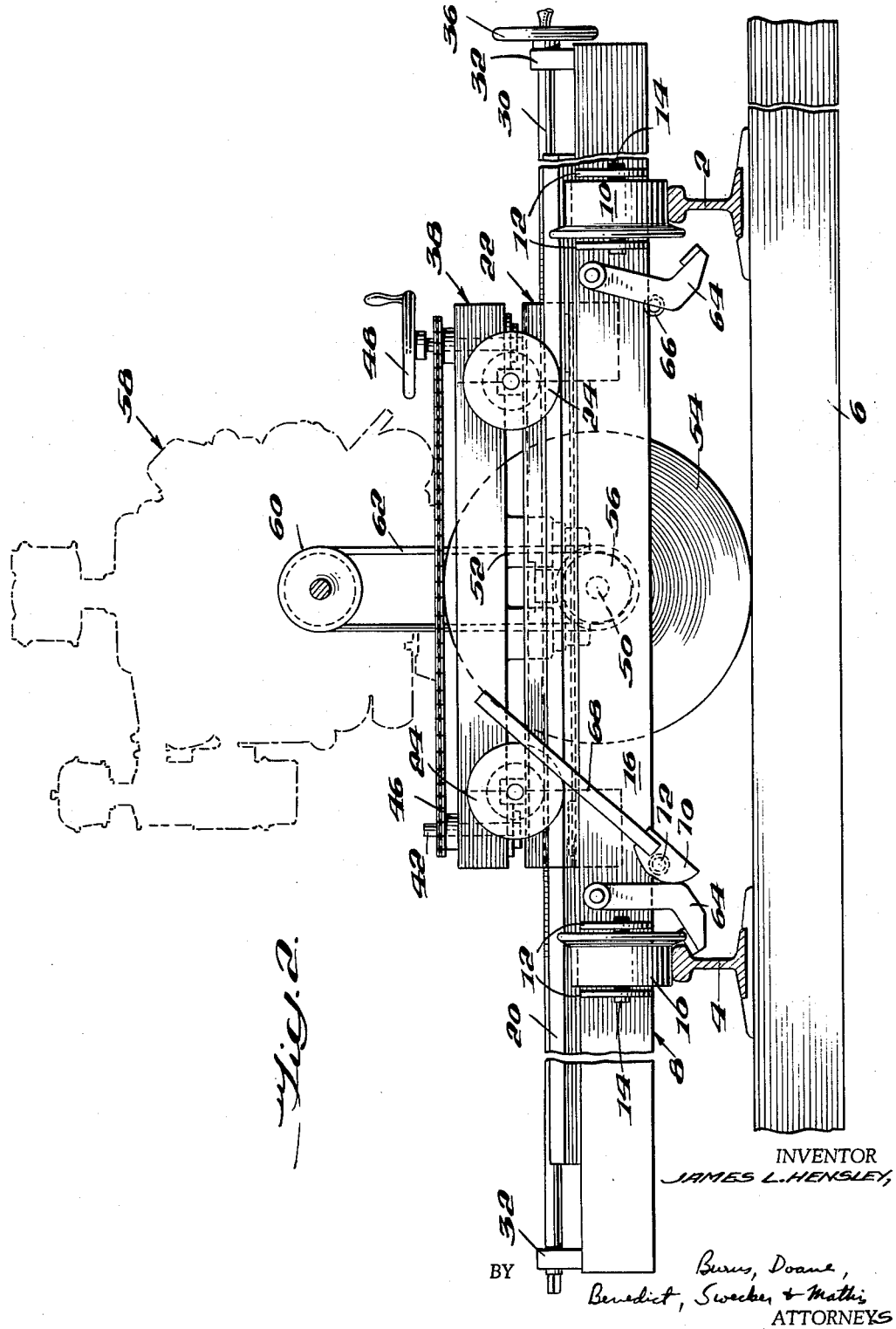
INVENTOR
JAMES L. HENSLEY,
BY Burns, Doane,
Benedict, Swecker & Mathis
ATTORNEYS

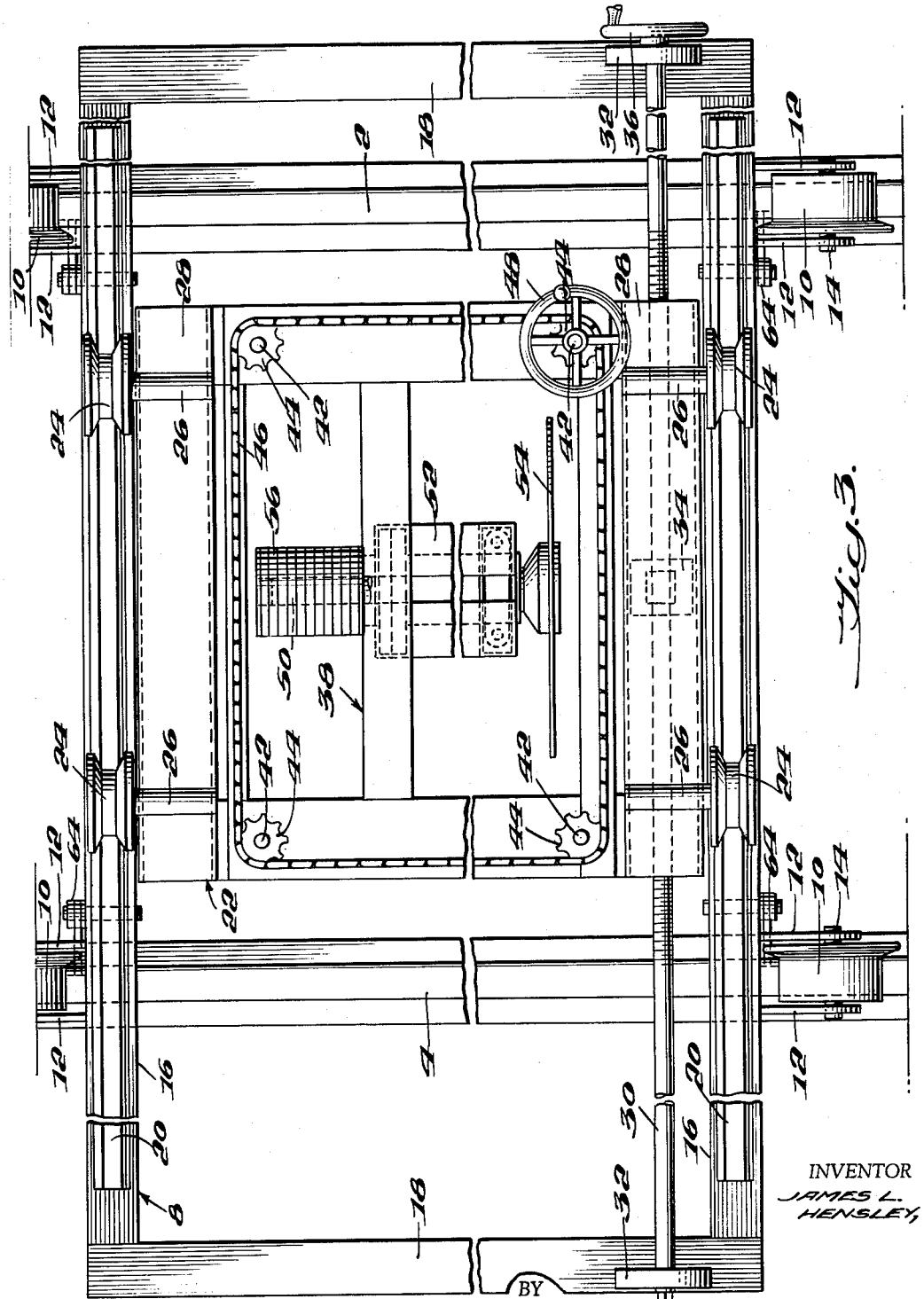

June 7, 1966
J. L. HENSLEY
3,254,455
RAIL SAW
Filed Oct. 16, 1963
6 Sheets-Sheet 4
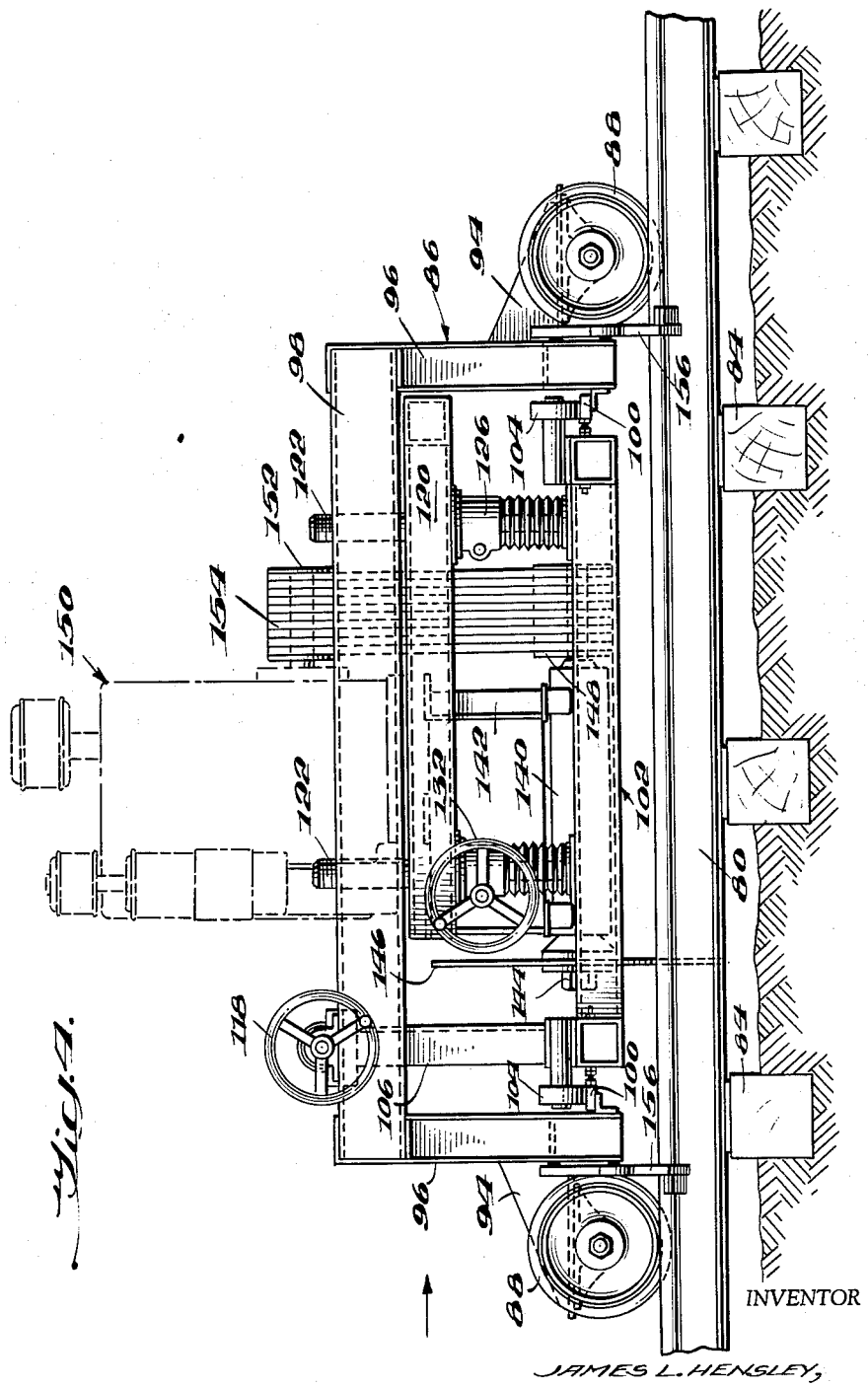
INVENTOR
JAMES L. HENSLEY,
BY
ATTORNEYS

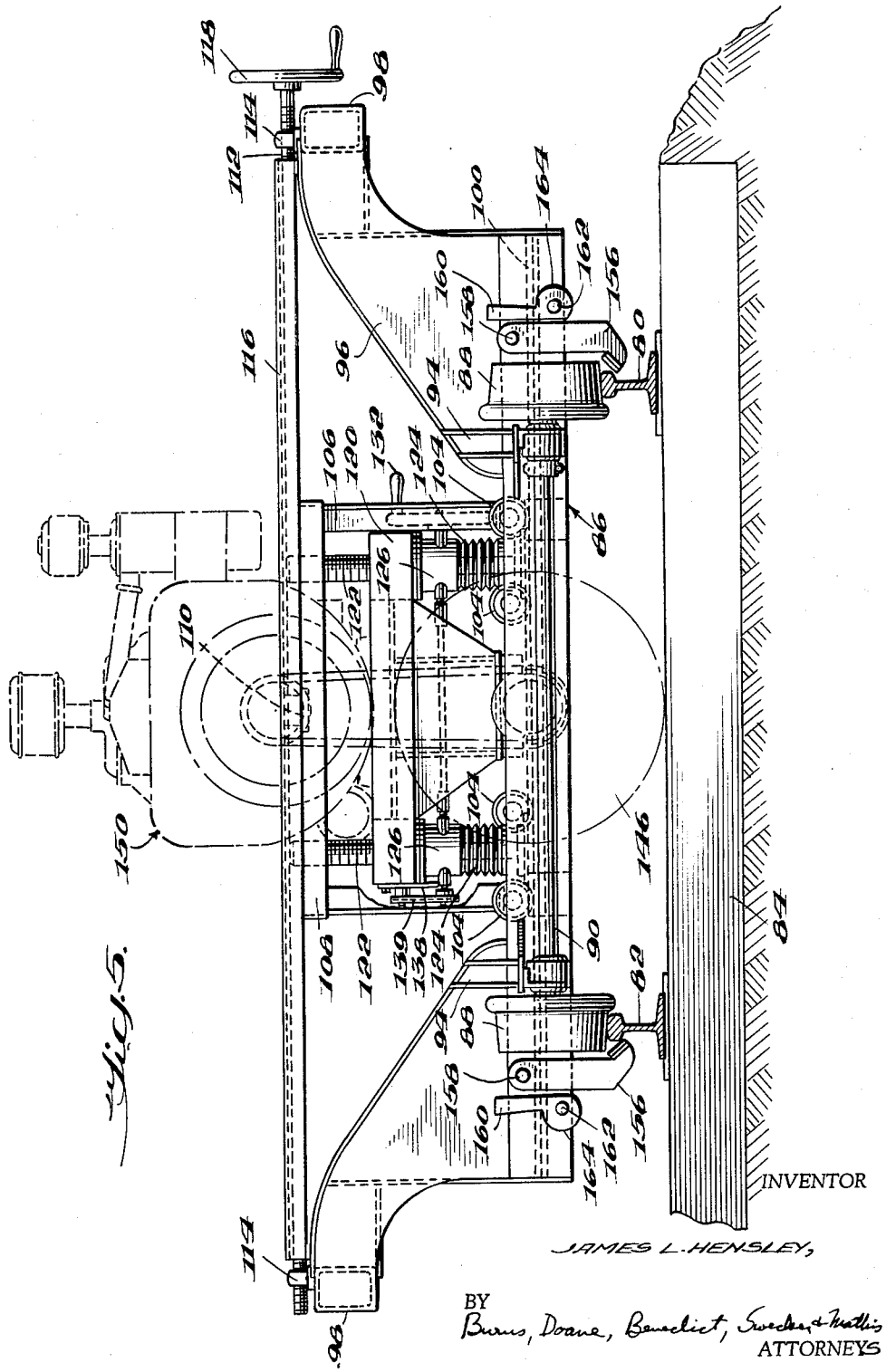

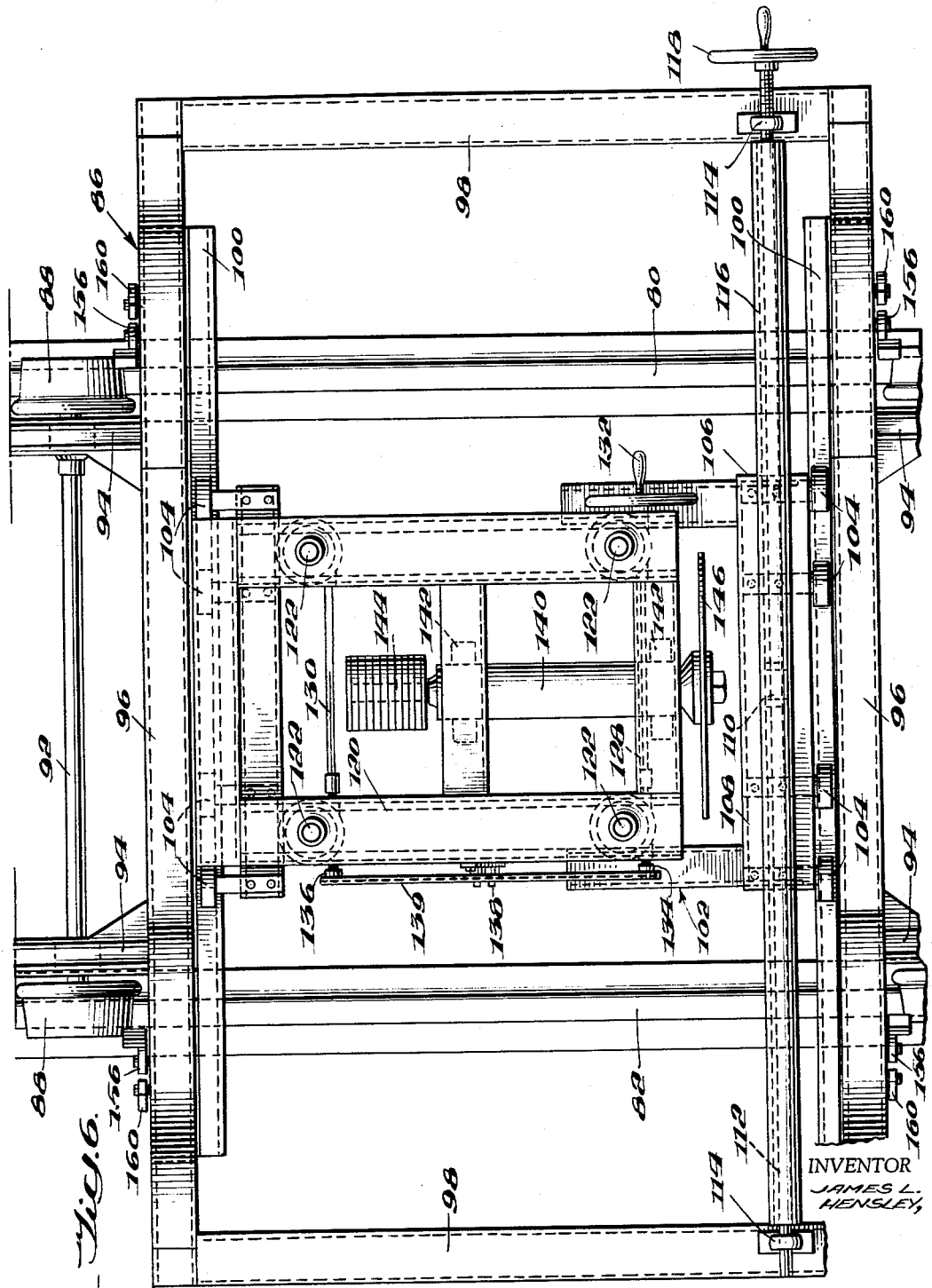

3,254,455
RAIL SAW
James L. Hensley, Clinton, Tenn., assignor to Tysaman Machine Company, Knoxville, Tenn., a corporation of Delaware
Filed Oct. 16, 1963, Ser. No. 316,659
9 Claims. (Cl. 51—178)

This invention relates to severing apparatus and, more particularly, to apparatus for severing train track rails in place on a road bed.

In installing and maintaining railroad tracks, it is necessary to sever the rails at various points along the rails to remove defective or damaged rail sections. It has been proposed heretofore to mount a rotary metal cutting saw on a carriage having wheels which roll along the track. A motor on the carriage provides power for rotation of the saw. The saw is mounted on a frame in position for severing the rail under the saw at the desired location by vertical swinging movement of the frame relative to the carriage.

Often it is necessary to sever both rails along a section of track. In using the prior art machine one of the rails is severed at the desired intervals along the track a few thousand feet, or more and then the carriage is lifted off the tracks, turned around and placed on the tracks again by a railroad crane. The carriage with the saw is then moved back up the track, making cuts in the opposite rail at the desired intervals. This procedure is slow and uneconomical, since a crane and its crew must be available for lifting the carriage off of the tracks and turning it around. Furthermore, time is wasted in turning the carriage around.

In view of the defects of prior art rail severing apparatus, it is an object of this invention to provide an improved rail severing machine.

It is another object of this invention to provide a rail saw machine for severing selectively either rail of a pair of tracks, without removing the carriage from the rails.

It is a further object of this invention to provide an efficient rail severing apparatus.

It is a still further object of this invention to provide an improved rail saw which is operated with a minimum of labor.

These objects are accomplished in accordance with the preferred embodiment of the invention by a saw apparatus having a carriage provided with a pair of wheels for mounting the carriage on a pair of railroad tracks. A pair of transverse rails are mounted on the carriage and a frame provided with suitable wheels is mounted for longitudinal movement along the transverse rails. A metal saw is journaled in bearings on the frame and mounted in a plane perpendicular to the railroad tracks. A prime mover on the frame transmits power to rotate the saw and the frame is moved transversely of the railroad tracks along the rails by means of a hand operated lead screw. The carriage is sufficiently wide to permit the metal saw to engage selectively either of the rails for sawing through them. As the saw wears, the frame may be lowered by means of screw jacks at the corners of the frame.

This preferred embodiment of the invention is illustrated in the accompanying drawings, in which:

FIG. 2 is a front elevational view of the saw apparatus;

FIG. 3 is a top plan view of the saw apparatus, with the engine removed;

FIG. 4 is a side elevational view of a modified form of the saw apparatus of this invention;

FIG. 5 is a front elevational view of the modified form of the saw apparatus; and FIG. 6 is a top plan view of the modified form of the saw apparatus, with the engine removed.

Figure 1:
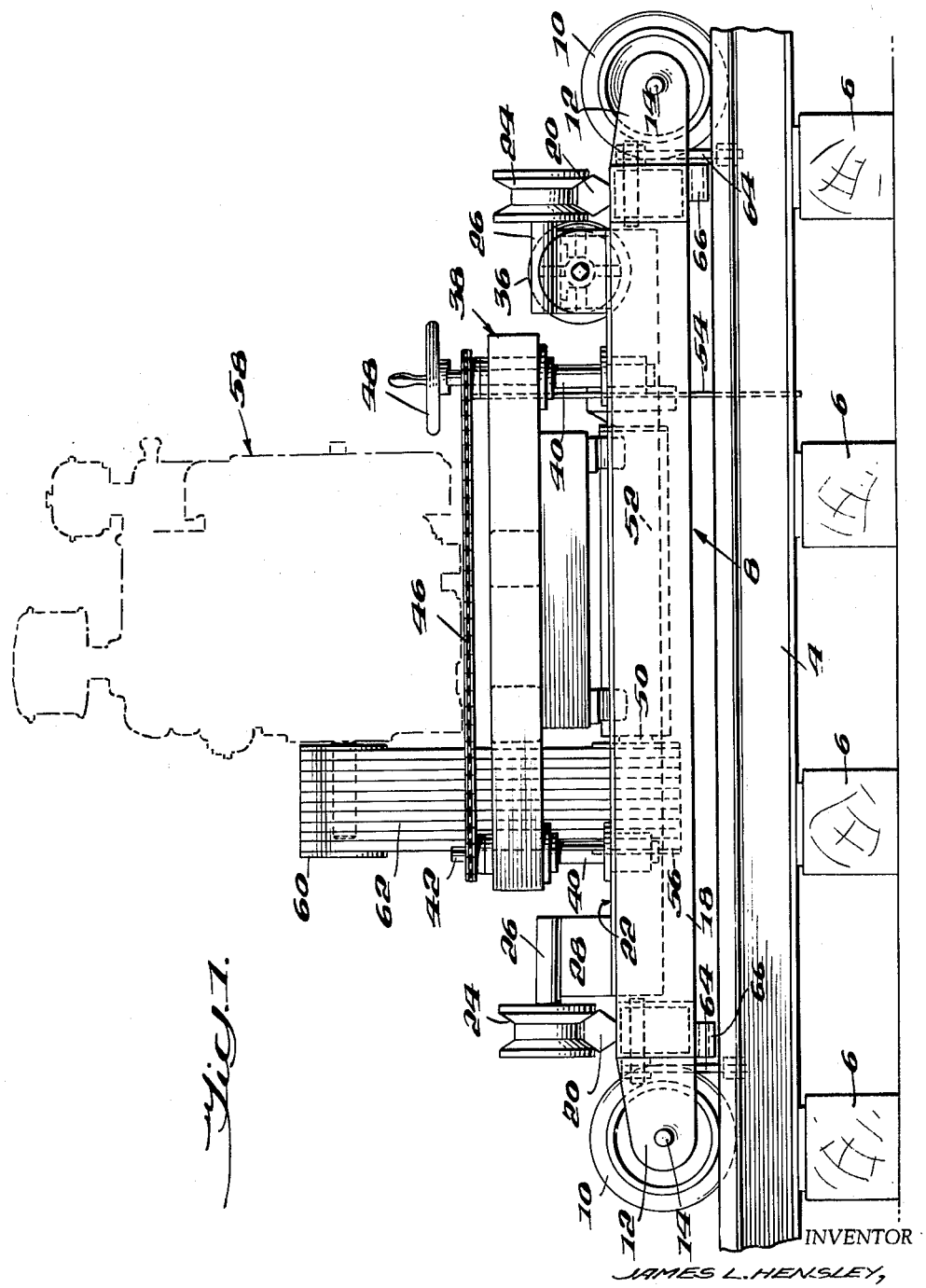
FIG. 1 is a side elevational view of the saw apparatus of this invention.

Referring to FIGS. 1 to 3 of the drawings, a pair of conventional train rails 2 and 4 are secured to ties 6. A frame 8 is supported on the rails 2 and 4 by flanged wheels. The wheels 10 are each mounted between a pair of brackets 12, which extend outward from the frame 8, and axles 14 support the respective wheels 10 for rotation in position for rolling along the tracks 2 and 4. The frame 8 extends transversely of the rails 2 and 4 and is formed of longitudinal frame members 16 and end frame members 18. Cross rails 20 are secured by welding or other suitable means on the longitudinal frame members 16.

A carriage 22 is suspended between the rails 20 and is mounted for movement along the rails 20 relative to the frame 8 by means of flanged wheels 24, which are mounted for rotation on axles secured in brackets 26 on the carriage 22. The brackets 26 are secured to box frame members 28, which form part of the carriage 22. A feed screw 30 is journaled at its opposite ends in brackets 32 on the frame members 18. The feed screw 30 extends through the hollow frame member 28 and a threaded nut 34, which is secured to the inside of the frame member 28 engages the screw threads on the feed screw 30. The feed screw 30 may be rotated by means of a hand wheel 36 to advance the nut 34. Since the nut 34 is secured to the carriage 22, the carriage rolls along the rails 20 transversely of the track rails 2 and 4. The carriage frame 22 is rigid and the wheels 24 are flanged on both sides, so that there is no tendency for the carriage 22 to twist or cant, although the feed screw 30 and driving nut 34 are at an offset location.

A platform 38 is mounted above the carriage 22 on screw jacks 40. Each of the jacks 40 has a screw 42, to which is keyed, or otherwise secured, a sprocket 44. A roller chain 46 extends around each of the sprockets 44, as shown in FIG. 3. A hand wheel 48 is mounted on one of the screws 42 and keyed thereto, so that rotation of the hand wheel 48 turns the sprocket 44 under the hand wheel 48, thereby moving the chain 46 to turn the other sprockets 44 and thereby to rotate each of the screws 42 equally. The screws 42 engage internal threads in the platform 38 to change the height of the platform relative to the carriage 22. Below the platform 38, an arbor 50 is journaled for rotation in a bearing 52. A metal cutting abrasive saw 54 is mounted on one end of the arbor 50 and a drive pulley 56 is secured on the opposite end of the arbor. As shown in phantom lines in FIGS. 1 and 2, a conventional gasoline engine 58 is mounted on the platform 38. A pulley 60 is secured on the drive shaft of the engine 58 and a plurality of power transmission belts 62 extend between the pulleys 56 and 60 for transmitting power from the engine 58 to the arbor 50 for rotating the saw 54. Since the cutting of the saw 54 occurs along its peripheral edge, the abrasive saw wheel is worn away, reducing the wheel diameter during cutting. To compensate for this wear of the saw wheel, the platform 38 may be lowered by means of the hand wheel 48. The jacks 40 also are used to raise the saw 54 above the ties 6, before the frame 8 is moved along the rails 2 and 4.

The frame 8 is secured by means of clamps 64 to the track rails 2 and 4 at a location where the rails are to be cut. As shown in FIG. 2, a clamp 64 is mounted for a swinging movement on the frame members 16 adjacent each of the wheels 10. A socket 66 is secured to the bottom of the frame members 16 adjacent each of the clamps 64. A clamp handle 68 has a cam plate 70 secured to one end of the handle. A pin 72 is secured to the plate 70 and extends outward from the plate 70 for insertion in the socket 66. Rotation of the handle 68 about the socket 66 causes the plate 70 to engage the edge of the clamp 64 and to cam it against the rail 4. Each of the other clamps 64 are secured against the respective rails 2 and 4 by similar clamp handles 68. The clamps 64 are disconnected from the rails, after a saw cut has been made, by swinging the handles 68 upward and removing them from the sockets 66.

In operation, the cut off saw machine of this invention is rolled along the tracks 2 and 4, until the location of the desired saw cut is reached. While the saw machine is being moved along the rails 2 and 4 from one location to another, it may be necessary to raise the platform 38 relative to the frame 8, so that the saw 54 will clear the railroad ties 6 and there will be no interference between the ties and the saw blade. After the location of the saw cut has been aligned with the saw wheel 54, the frame 8 is clamped to the rails 2 and 4 by means of the swinging clamps 64. After the frame 8 has been clamped in position and the engine 58 has been started, the platform 38 may be lowered by means of the hand wheel 48, so that the saw 54 extends below the level of the bottom of the rails 2 and 4 which are to be cut. When the depth of the saw blade has been properly adjusted, the cut is made by rotating the hand wheel 36 to cause the carriage 22 to move longitudinally along the rails 20 for severing selectively either the rail 2 or the rail 4. Turning the hand wheel 36 in one direction moves the carriage toward the rail 2, and turning the hand wheel in the opposite direction moves the carriage toward the rail 4. Therefore, either of the rails can be cut without moving the frame 8 and without turning the frame 8.

A modified form of the invention is shown in FIGS. 4 to 6. Near railroad stations, platforms extend close to the tracks and are often raised above the level of the tracks. Although the rail saw shown in FIGS. 1 to 3 operates satisfactorily in open areas where there are no obstructions adjacent the rails, the carriage of the saw apparatus may be too wide to permit the saw apparatus to pass between the platforms. Accordingly, the modified rail saw is arranged to provide the necessary clearance to permit the rail saw to pass between station platforms.

As shown in FIGS. 4, 5 and 6, the saw apparatus rides on a pair of conventional train rails 80 and 82, which are supported on conventional ties 84. A frame 86 is supported on the rails 80 and 82 by flanged wheels 88 which are mounted on axles 90 and 92. The axles 90 and 92 are journaled in bearings which are suspended from the frame 86 by brackets 94. The frame 86 extends transversely of the rails 80 and 82 and is formed of longitudinal frame members 96 and end frame members 98. The longitudinal frame members 96 project upward from the rails 80 and 82 at opposite ends and the end frame members 98 are secured between the projecting cantilever portions of the members 96, thereby providing the necessary clearance for the frame 86 to pass between station platforms. A pair of cross rails 100 are supported on opposing faces of the longitudinal frame members 96 by brackets or other suitable means.

A carriage 102 is supported for movement along the cross rails 100 by a plurality of rollers 104 which are journaled in brackets on the carriage 102. An upright frame 106 having a horizontal connecting member 108 is mounted on the carriage. A threaded nut 110 is secured to the top of the horizontal member 108, and a feed screw 112 is threaded through the nut 110. The feed screw 112 is journaled in bearings 114 at its opposite ends, which are secured to the respective end members 98. A cover plate 116, which is mounted over the feed screw, protects the threads of the feed screw 112, and a hand wheel 118 is secured to one end of the feed screw for turning the screw. Since the nut 110 is connected to the carriage 102 by the frame 106, rotation of the lead screw 112 causes the carriage to move along the rails 100 relative to the frame 86.

A platform 120 is supported over the carriage 102 by screw jacks 122 at each corner on the platform 120. Dust covers 124 protect the screw threads between the platform and the carriage. A rotatable collar assembly 126 under each corner of the platform engages the threads of the respective screw jacks 122 and the platform 120 rests on top of each collar assembly. The circumference of the collar is provided with gear teeth which cooperate with a worm gear within the assembly 126. Two of the worm gears are connected together by a shaft 128 which is mounted at one end of the platform and the other worm gears are connected together by another shaft 130 which is mounted at the opposite end of the platform. A hand wheel 132 is secured on one end of the shaft 128 and a sprocket wheel 134 is secured on the opposite end of the shaft. The shaft 130 is also provided with a sprocket wheel 136 on the same side of the platform as the sprocket wheel 134. A conventional chain slack adjuster 138 is mounted on the platform 120 between the sprocket wheels 134 and 136. The slack adjuster 138 includes a pair of sprocket wheels mounted on a plate which is adjustable to various positions for changing the length of the path of a chain 139 which extends between the sprocket wheels 134 and 136. One run of the chain passes over the sprocket wheels of the adjuster 138. By adjusting the angular position of the plate, the length of the run through the adjuster 138 may be changed to take up the slack in the chain 139. The elevation of the platform 120 relative to the carriage 102 may be changed by turning the hand wheel 132. When the shafts 128 and 130 are rotated in one direction, the platform is raised and when the shafts are rotated in the opposite direction, the platform is lowered.

A bearing block 140 is supported by brackets 142 which are secured to the platform 120, and an arbor 144 is journaled in the bearing block 140. A saw wheel 146 is mounted on one end of an arbor 144 and a pulley 148 is mounted on the opposite end of the arbor. A conventional gasoline engine 150 is mounted on the platform 120 and a pulley 152 is mounted on the take off shaft of the engine 150. Power is transmitted from the engine to the arbor 144 by a plurality of V-belts 154 which extend between the pulleys 148 and 152.

To prevent movement of the frame 86 along the rails 80 and 82, while the saw 140 is cutting the rails, clamps 156, as shown in FIG. 5, are mounted on the longitudinal members 96 adjacent the wheels 88 for engaging the rails 80 and 82, respectively. Each clamp 156 is mounted for swinging movement on a pin 158. A lever 160 is also mounted on the member 96 adjacent to the clamp 156 for swinging movement about a pin 162. The lever 160 has a cam surface 164 for engaging the edge of the clamp 156. Upon swinging the lever 160 downward, the cam surface 164 engages the edge of the clamp 156 to urge it against the adjacent rail 80 and 82, respectively. The clamp 156 is released by rotating the lever 160 upward and away from the clamp 156.

In operation, the saw wheel 146 is raised above the level of the rails 80 and 82 to prevent its breakage during movement of the saw apparatus along the rails. The wheel 146 is raised by rotating the hand wheel 132 to raise the platform 120 relative to the carriage 102. The saw apparatus may then be rolled along the rails. The shape of the longitudinal frame members 96 permits the saw apparatus to pass between platforms in a railroad station area. When the location of the next saw cut is reached, the clamps 156 are applied at each wheel. After the engine 150 is started, the hand wheel 118 is turned to move the carriage 102 along the tracks 100, and the hand wheel 132 is turned to lower the wheel 146 sufficiently to cut through the rails 80 and 82. As shown in FIGS. 5 and 6, there are four rollers 104 supporting each end of the carriage 102 on the tracks 100. When the carriage 102 has been moved to the extreme limit of its travel, the outermost roller 104 is beyond the end of the track 100 and the carriage is supported by the remaining three rollers. In this position, the saw 146 has cut through the rail. Rotation of the hand wheel 118 in the opposite direction moves the carriage toward the opposite rail until the saw wheel 146 has passed through the opposite rail. In that position, the outermost roller 104 is beyond the end of the track 100 and the next roller is immediately adjacent the end of the track, and the remaining three rollers support the carriage on the frame 86.

The particular advantage of the rail saw of this invention is that a minimum of labor and equipment is required to operate the rail saw. The saw cuts may be made using the rail saw of this invention by a single operator, without the assistance of railroad cranes or other auxiliary equipment, as is required by prior art rail saws. Either of the track rails may be cut with equal facility.

While this invention has been illustrated and described in a preferred embodiment, it is recognized that variations and changes may be made therein without departing from the invention as set forth in the claims.

I claim:

1. Rail cutting apparatus comprising a frame, means for mounting the frame on a pair of rails, tracks extending transversely of the frame, a carriage, means mounting the carriage for reciprocating movement along the tracks, means for moving the carriage along the tracks, a platform, means mounting the platform on the carriage, bearing means on the platform, a saw blade, means mounting the blade in the bearing means for rotation, power means, said power means being mounted on the platform over the bearing means, means for raising and lowering the platform relative to the frame, and means forming a driving connection between the power means and the saw blade.

2. Rail cutting apparatus comprising a frame, means for mounting the frame on a pair of rails, said frame having opposite longitudinal members and opposite end members, said longitudinal members extending transversely of said rails and having upright cantilever portions at opposite ends thereof, said end members extending between said cantilever portions of said longitudinal members, a platform on the frame, a platform on the carriage, a saw blade, means mounting the blade on the platform for rotation about an axis extending along the rails, power means for rotating the blade, means for adjusting the height of the platform relative to the carriage, and means for moving the carriage transversely between the rails whereby the rails are cut.

3. Rail cutting apparatus comprising a frame, means mounting wheels on opposite sids of the frame for supporting said frame on rails, tracks extending across said frame at substantially right angles to the planes of said wheels, a carriage, means mounting wheels on said carriage in position for rolling said carriage along said tracks, a feed screw extending along said tracks, a nut cooperating with said feed screw, means mounting said feed screw on said frame and said nut on said carriage for displacing the carriage relative to the frame upon rotational movement of the screw, a saw blade, means mounting the blade on the carriage for rotation about an axis extending at right angles to the tracks, and means for rotating the blade, said saw blade being movable along said tracks a greater distance than the transverse separation between said wheels.

4. Rail cutting apparatus comprising a frame, means mounting wheels on opposite sides of the frame for supporting said frame on rails, tracks extending across said frame at substantially right angles to the planes of said wheels, a carriage, means mounting wheels on said carriage in position for rolling said carriage along said tracks, means for selectively displacing said carriage along said tracks, said tracks having a greater length than the transverse separation between said wheels, a plurality of upright jacks on said carriage, a platform, means mounting said platform on said jacks, said platform mounting means including means for adjusting the height of said platform above said carriage, a saw blade, means mounting the blade on the platform for rotation about an axis extending at right angles to the tracks, and means for rotating the blade.

5. Rail cutting apparatus comprising a frame, means mounting wheels on opposite sides of the frame for supporting said frame on rails, tracks extending across said frame at substantially right angles to the planes of said wheels, a carriage, means mounting wheels on said carriage in position for rolling said carriage along said tracks, means for selectively displacing said carriage along said tracks, said tracks having a greater length than the transverse separation between said wheels, a platform, means mounting said platform on said carriage, said platform mounting means including a plurality of screws and a nut on each screw, means for simultaneously rotating each screw to raise and lower the platform selectively, a saw blade, means mounting the blade on the platform for rotation about an axis extending at right angles to the tracks, and means for rotating the blade.

6. Rail cutting apparatus comprising a frame, means mounting wheels on opposite sides of the frame for supporting said frame on rails, tracks extending across said frame at substantially right angles to the planes of said wheels, a carriage, means mounting wheels on said carriage in position for rolling said carriage along said tracks, a feed screw extending along said tracks, a nut cooperating with said feed screw, means mounting said feed screw on said frame and said nut on said carriage for displacing the carriage relative to the frame upon rotational movement of the screw, said tracks having a greater length than the transverse separation between said wheels, a plurality of upright jacks on said carriage, a platform, means mounting said platform on said jacks, said platform mounting means including means for adjusting the height of said platform above said carriage, a saw blade, means mounting the blade on the platform for rotation about an axis extending at right angles to the tracks, and means for rotating the blade.

7. Rail cutting apparatus comprising a frame, means for mounting opposite end portions of the frame in upright planes on a pair of rails for movement therealong, a carriage on the frame, a power operated saw mounted on the carriage and including an upright blade rotatable about an axis extending lengthwise of the rails, means mounting the carriage on the frame for movement lengthwise relative thereto and for movement of the saw in a fixed plane to respective positions in which the blade axis lies within either of the planes of the means mounting the frame on the rails, whereby the carriage travels far enough to either side so as to sever either rail without bodily turning the saw relative to the carriage.

8. Rail cutting apparatus according to claim 7, wherein the power operated saw is mounted in a fixed position relative to the carriage.

9. Rail cutting apparatus according to claim 7, including means connected with the carriage for adjusting the height of the saw relative to the rails.

(References on following page)

References Cited by the Examiner

UNITED STATES PATENTS

| | | | |
|---|---|---|---|
| 239,227 | 3/1881 | Critchlow | 83—488 |
| 400,707 | 4/1889 | Perkins | 83—488 X |
| 1,420,950 | 6/1922 | Elder. | |
| 1,887,424 | 11/1932 | Perazzoli | 51—178 X |
| 2,207,883 | 7/1940 | Woolery. | |
| 2,603,255 | 7/1952 | Woolery. | |

FOREIGN PATENTS

| | | |
|---|---|---|
| 142,790 | 7/1903 | Germany. |
| 773,141 | 4/1957 | Great Britain. |

OTHER REFERENCES

Rail Joint Cross Grinder, Model P-11, Railway Trackwork Company, Copy in Group 340.

WILLIAM W. DYER, JR., *Primary Examiner.*

J. B. McGUIRE, F. T. YOST, *Assistant Examiners.*